US011898066B2

(12) United States Patent
Fujiwara

(10) Patent No.: US 11,898,066 B2
(45) Date of Patent: Feb. 13, 2024

(54) ADHESIVE MEMBER AND DISPLAY DEVICE INCLUDING THE SAME

(71) Applicant: Samsung Display Co., Ltd., Yongin-si (KR)

(72) Inventor: Tetsuya Fujiwara, Yokohama (JP)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 0 days.

(21) Appl. No.: 17/859,494

(22) Filed: Jul. 7, 2022

(65) Prior Publication Data

US 2023/0136807 A1 May 4, 2023

(30) Foreign Application Priority Data

Oct. 27, 2021 (KR) .................. 10-2021-0144468

(51) Int. Cl.
  *C09D 175/06* (2006.01)
  *C09J 7/38* (2018.01)
  *C09J 175/06* (2006.01)

(52) U.S. Cl.
  CPC ............ *C09J 175/06* (2013.01); *C09J 7/385* (2018.01); *C09J 2203/318* (2013.01)

(58) Field of Classification Search
  None
  See application file for complete search history.

(56) References Cited

U.S. PATENT DOCUMENTS

2021/0214482 A1* 7/2021 Morita ................. C08F 226/06
2023/0139019 A1* 5/2023 Yamamoto ........ C08F 222/1065
   522/96

FOREIGN PATENT DOCUMENTS

| JP | 5826639 B2 | 12/2015 |
| JP | 6220495 B2 | 10/2017 |
| JP | 2019061323 A | 4/2019 |
| JP | 6523098 B2 | 5/2019 |
| JP | 2019089975 A | 6/2019 |
| JP | 2019099714 A | 6/2019 |
| JP | 6697359 B2 | 5/2020 |
| JP | 6737585 B2 | 8/2020 |
| JP | 6792736 B1 | 11/2020 |
| KR | 1020180136712 A | 12/2018 |

(Continued)

Primary Examiner — Ramsey Zacharia
(74) Attorney, Agent, or Firm — CANTOR COLBURN LLP

(57) ABSTRACT

An adhesive member includes a polymer derived from a resin composition. The resin composition includes at least one (meth)acrylate monomer, at least one urethane (meth) acrylate oligomer, and at least one photoinitiator. The adhesive member has a glass transition temperature in a range of about −70° C. to about −30° C., a 180° peel force of about 800 gf/25 mm or greater at a temperature of 25° C., and a deformation recovery rate in a range of about 75% to about 100% at temperatures of −20° C. and 60° C. The deformation recovery rate satisfies the following equation: $X_2 = [1 − (X_1/25)] \times 100\%$, where $X_1$ denotes a shear strain measured 600 seconds after removing a shear stress applied in a way such that the adhesive member has a shear strain of 25% at the temperatures of −20° C. and 60° C., and $X_2$ denotes the deformation recovery rate.

20 Claims, 8 Drawing Sheets

(56) References Cited

FOREIGN PATENT DOCUMENTS

| KR | 1020200139623 A | 12/2020 |
|----|-----------------|---------|
| KR | 1020210076600 A | 6/2021  |

* cited by examiner

ADHESIVE MEMBER AND DISPLAY DEVICE INCLUDING THE SAME

This application claims priority to Korean Patent Application No. 10-2021-0144468, filed on Oct. 27, 2021, and all the benefits accruing therefrom under 35 U.S.C. § 119, the content of which in its entirety is herein incorporated by reference.

BACKGROUND

1. Field

The present disclosure herein relates to an adhesive member formed from a resin composition and a display device including the adhesive member.

2. Description of the Related Art

Various display devices used for multimedia devices such as a television, a mobile phone, a tablet computer, a navigation system, and a game machine are being developed. Recently, display devices which are foldable, bendable, or rollable by being provided with bendable flexible display members are being developed to improve portability and user convenience.

SUMMARY

In a flexible display device, each of members therein is desired to secure reliability during a folding or bending operation. In addition, an adhesive resin used for forming an adhesive layer applied to display devices in various shapes is desired to have application stability for members of various types of display devices.

The disclosure provides an adhesive member which may be formed by an inkjet printing method, and which have high adhesion reliability and folding reliability.

The disclosure also provides a display device with improved reliability by including an adhesive member having high adhesion reliability and folding reliability.

An embodiment of the invention provides an adhesive member including a polymer derived from a resin composition including at least one (meth)acrylate monomer, at least one urethane (meth)acrylate oligomer, and at least one photoinitiator, where the adhesive member has a glass transition temperature in a range of about −70° C. to about −30° C., a 180° peel force of about 800 gf/25 mm or greater for a glass substrate at a temperature of 25° C., and a deformation recovery rate in a range of about 75% to about 100% at temperatures of −20° C. and 60° C., where the deformation recovery rate satisfies the following equation: $X_2=[1-(X_1/25)]\times100\%$, where $X_1$ denotes a shear strain measured 600 seconds after removing a shear stress applied in a way such that the adhesive member has a shear strain of 25% at the temperatures of −20° C. and 60° C., and $X_2$ denotes the deformation recovery rate.

In an embodiment, the adhesive member may have a first stress relaxation ratio in a range of about 75% to about 95% for the shear strain of 25% at a temperature of −20° C., where the first stress relaxation ratio may satisfy the following equation: $Y_3=[1-(Y_1/Y_2)]-100\%$, where $Y_1$ denotes a first shear stress measured immediately after the shear strain of 25% is exhibited at the temperature of −20° C., $Y_2$ denotes a second shear stress measured 10 seconds after the shear strain of 25% is exhibited at the temperature of −20° C., and $Y_3$ denotes a first stress relaxation ratio.

In an embodiment, the adhesive member may have a second stress relaxation ratio in a range of about 1% to about 30% for the shear strain of 25% at a temperature of 60° C., where the second stress relaxation ratio may satisfy the following equation: $Z_3=[1-(Z_1/Z_2)]\times100\%$, where $Z_1$ denotes a third shear stress measured immediately after the shear strain of 25% is exhibited at the temperature of 60° C., $Z_2$ denotes a fourth shear stress measured 10 seconds after the shear strain of 25% is exhibited at the temperature of 60° C., and $Z_3$ denotes the second stress relaxation ratio.

In an embodiment, the resin composition may have a viscosity in a range of about 5 centipoise (cP) to about 50 cP as measured at a temperature of 25° C. according to JIS K 2283.

In an embodiment, the (meth)acrylate monomer may have a weight average molecular weight in a range of about 100 to about 500.

In an embodiment, the urethane (meth)acrylate oligomer may have a weight average molecular weight in a range of about 10,000 to about 40,000.

In an embodiment, the urethane (meth)acrylate oligomer may include a plurality of acryl groups.

In an embodiment of the invention, a display device includes a display panel, a window disposed on the display panel, and an adhesive member disposed between the display panel and the window, where the adhesive member includes a polymer derived from a resin composition including at least one (meth)acrylate monomer, at least one urethane (meth)acrylate oligomer, and at least one photoinitiator, where the adhesive member has a glass transition temperature in a range of about −70° C. to about −30° C., a 180° peel force of about 800 gf/25 mm or greater for a glass substrate at a temperature of 25° C., and a deformation recovery rate in a range of about 75% to about100% at temperatures of −20° C. and 60° C., where the deformation recovery rate satisfies the following equation: $X_2=[1-(X_1/25)]\times100\%$, where $X_1$ denotes a shear strain measured 600 seconds after removing a shear stress applied in a way such that the adhesive member has a shear strain of 25% at the temperatures of −20° C. and 60° C., and $X_2$ is the deformation recovery rate.

In an embodiment, the adhesive member may have a first stress relaxation ratio of about 75% to about 95% for the shear strain of 25% at a temperature of −20° C., where the first stress relaxation ratio may satisfy the following equation: $Y_3=[1-(Y_1/Y_2)]\times100\%$, where $Y_1$ denotes a first shear stress measured immediately after the adhesive member exhibits the shear strain of 25% at the temperature of −20° C., $Y_2$ denotes a second shear stress measured 10 seconds after the adhesive member exhibits the shear strain of 25% at the temperature of −20° C., and $Y_3$ denotes a first stress relaxation ratio.

In an embodiment, the adhesive member may have a second stress relaxation ratio in a range of about 1% to about 30% for the shear strain of 25% at a temperature of 60° C., where the second stress relaxation ratio may satisfy the following equation: $Z_3=[1-(Z_1/Z_2)]\times100\%$, where $Z_1$ denotes a third shear stress measured immediately after the shear strain of 25% is exhibited at the temperature of 60° C., $Z_2$ denotes a fourth shear stress measured 10 seconds after the shear strain of 25% is exhibited at the temperature of 60° C., and $Z_3$ denotes the second stress relaxation ratio.

In an embodiment, the resin composition may have a viscosity of about 5 cP to about 50 cP as measured at a temperature of 25° C. according to JIS K 2283.

In an embodiment, the (meth)acrylate monomer may have a weight average molecular weight of about 100 to about 500, and the urethane (meth)acrylate oligomer may have a weight average molecular weight of about 10,000 to about 40,000.

In an embodiment, the adhesive member may have a thickness in a range of about 50 micrometers (μm) to about 200 μm.

In an embodiment, the adhesive member may be formed by providing the resin composition on one surface of the window or on one surface of the display panel, and then ultraviolet curing the resin composition.

In an embodiment, the display device may further include a light control layer disposed between the adhesive member and the window, and an optical adhesive layer disposed between the light control layer and the window, where the optical adhesive layer may include a polymer derived from the resin composition.

In an embodiment, the optical adhesive layer may have a 180° peel force of about 800 gf/25 mm or greater at a temperature of 25° C., where the 180° peel force is a peel force for a glass substrate.

The light control layer may be a polarizing plate or a color filter layer.

In an embodiment, the display device may further include an input sensing unit disposed on the display panel, where the adhesive member may be disposed between the display panel and the input sensing unit or between the input sensing unit and the window.

In an embodiment, the display panel may include a display element layer and an encapsulation layer disposed on the display element layer, where the input sensing unit may be disposed on the encapsulation layer, and the adhesive member may be disposed on the input sensing unit.

In an embodiment, at least one folding region may be defined in the display device, where the folding region may have a radius of curvature of about 5 mm or less.

BRIEF DESCRIPTION OF THE DRAWINGS

The above and other features of the invention will become more apparent by describing in further detail embodiments thereof with reference to the accompanying drawings, in which.

DETAILED DESCRIPTION

Figure 1A:
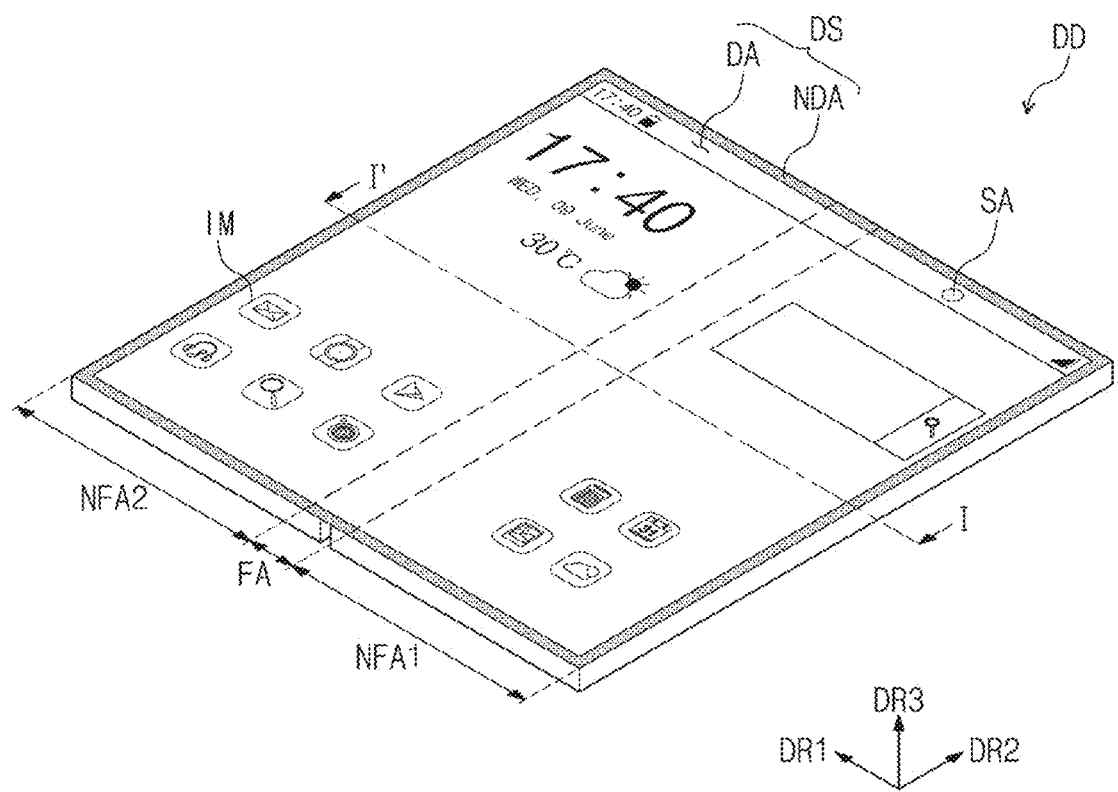
FIG. 1A is a perspective view of an embodiment of a display device according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In the present disclosure, when an element (or a region, a layer, a portion, and the like) is referred to as being "on," "connected to," or "coupled to" another element, it means that the element may be directly disposed on/connected to/coupled to the other element, or that a third element may be disposed therebetween. In contrast, when an element is referred to as being "directly on" another element, there are no intervening elements present.

Like reference numerals refer to like elements. Also, in the drawings, the thickness, the ratio, and the dimensions of elements are exaggerated for an effective description of technical contents. "Or" means "and/or." The term "and/or," includes all combinations of one or more of which associated components may define.

It will be understood that, although the terms "first," "second," etc. may be used herein to describe various elements, these elements should not be limited by these terms. These terms are only used to distinguish one element from another. For example, a first element may be referred to as a second element, and a second element may also be referred to as a first element in a similar manner without departing the scope of rights of the present invention. The terms of a singular form may include plural forms unless the context clearly indicates otherwise.

In addition, terms such as "below," "lower," "above," "upper," and the like are used to describe the relationship of the components shown in the drawings. The terms are used as a relative concept and are described with reference to the direction indicated in the drawings.

It should be understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof .

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which the present invention pertains. It is also to be understood that terms such as terms defined in commonly used dictionaries should be interpreted as having meanings consistent with the meanings in the context of the related art, and should not be interpreted in too ideal a sense or an overly formal sense unless explicitly defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of an adhesive member and a display device including the adhesive member will be described in detail with reference to the accompanying drawings.

Figure 1B:
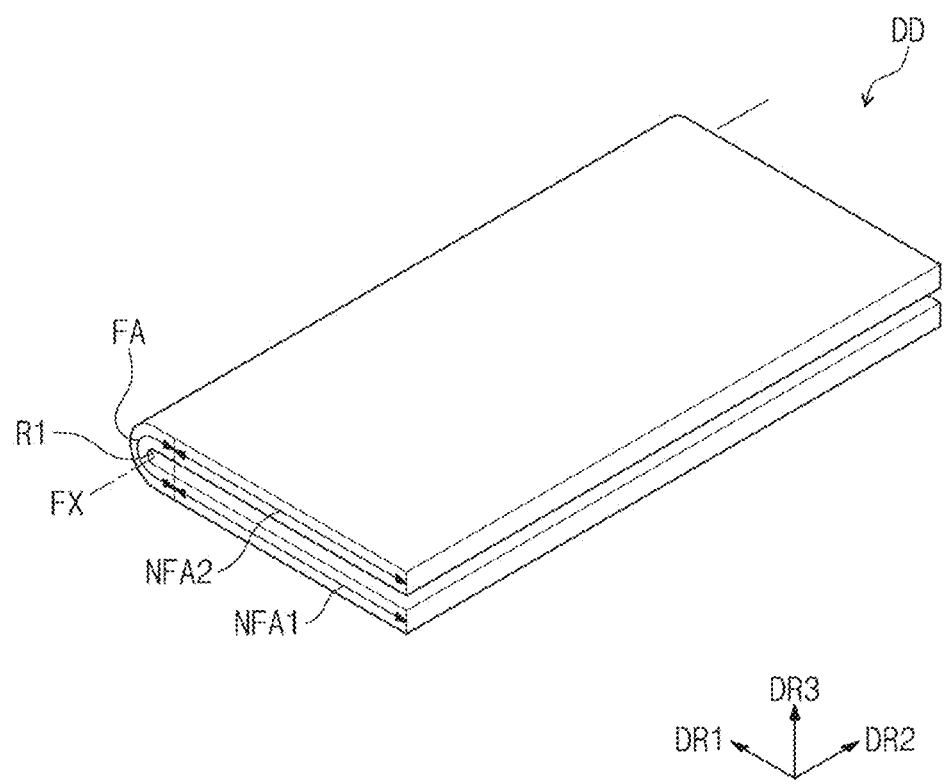
FIG. 1B is a view illustrating the display device illustrated in FIG. 1A in a folded state.

FIG. 1A is a perspective view of an embodiment of a display device according to the invention. FIG. 1B is a view illustrating the display device illustrated in FIG. 1A in a folded state. An embodiment of a display device DD may be a flexible display device which may be foldable or bendable, or which may be maintained to be in a folded state or bent state. In the specification, being flexible refers to having properties of being able to be bent, which is not limited to being able to be bent and completely folded, but includes being able to be bent to a degree of a few nanometers (nm).

Referring to FIG. 1A and FIG. 1B, an embodiment of the display device DD may be a device activated in accordance with an electrical signal. In an embodiment, for example, the display device DD may be a portable electronic device, a personal digital terminal, a tablet computer, a car navigation system unit, a game console, or a wearable device, but is not limited thereto. In FIG. 1A and FIG. 1B, embodiments where the display device DD is a portable electronic device are shown.

Referring to FIG. 1A, an embodiment of the display device DD may include a display surface DS defined by a first direction axis DR1 and a second direction axis DR2 crossing the first direction axis DR1. The display device DD may provide an image IM to a user through the display surface DS.

The display surface DS may include a display region DA and a non-display region NDA adjacent to the display region DA. The display region DA may display the image IM, and the non-display region NDA may not display the image IM. The non-display region NDA may surround the display region DA. However, the embodiment of the invention is not limited thereto. The shape of the display region DA and the shape of the non-display region NDA may be changed.

The display surface DS may further include a sensing region SA. The sensing region SA may be a part of the display region DA. The sensing region SA may have a transmittance higher than that of the display region DA. In an embodiment, an optical signal, for example, visible light or infrared light may pass through the sensing region SA. The display device DD may include an electronic module which captures an external image through the visible light passed through the sensing region SA, or determines proximity of an external object through the infrared light. In an embodiment, as shown in FIG. 1A, a single sensing region SA may be defined, but the embodiment of the invention is not limited thereto. Alternatively, the sensing region SA may be provided in plurality.

The thickness direction of the display device DD may be a direction parallel to a third direction axis DR3, which is a normal direction with respect to a plane defined by the first direction axis DR1 and the second direction axis DR2. Directions indicated by the first to third direction axes DR1, DR2, and DR3 described in the specification are a relative concept, and may be converted into different directions. In addition, the directions indicated by the first to third direction axes DR1, DR2, and DR3 may be described as first to third directions, and may be denoted by the same reference numerals. In the specification, the first direction axis DR1 and the second direction axis DR2 are perpendicular to each other, and the third direction axis DR3 may be a normal direction with respect to a plane defined by the first direction axis DR1 and the second direction axis DR2.

The display device DD may include a folding region FA and a plurality of non-folding regions NFA1 and NFA2. The non-folding regions NFA1 and NFA2 may include a first non-folding region NFA1 and a second non-folding region NFA2. The first non-folding region NFA1, the folding region FA, and the second non-folding region NFA2 may be sequentially disposed parallel to the first direction axis DR1.

In an embodiment, as shown in FIGS. 1A and 1B, the display device DD may include a single folding region FA and two non-folding regions NFA1 and NFA2, but the number of folding regions and the number of non-folding regions are not limited thereto. In an alternative embodiment, for example, a display device may include three or more non-folding regions and two or more folding regions disposed between adjacent non-folding regions.

In an embodiment, as illustrated in FIG. 1B, the folding region FA may be folded with respect to a folding axis FX parallel to the second direction axis DR2. The folding region FA may have a predetermined curvature and a predetermined radius of curvature R1. In an embodiment, for example, the radius of curvature R1 of the folding region FA may be about 5 millimeters (mm) or less.

When the display device DD is folded, the non-folding regions NFA1 and NFA2 may face each other. When the display device DD is completely folded, the display surface DS may not be exposed to the outside, which may be referred to as in-folding. Although not illustrated, in an embodiment, when the display device DD is completely folded, the display surface DS may be exposed to the outside, which may be referred to as outer-folding.

Figure 2:
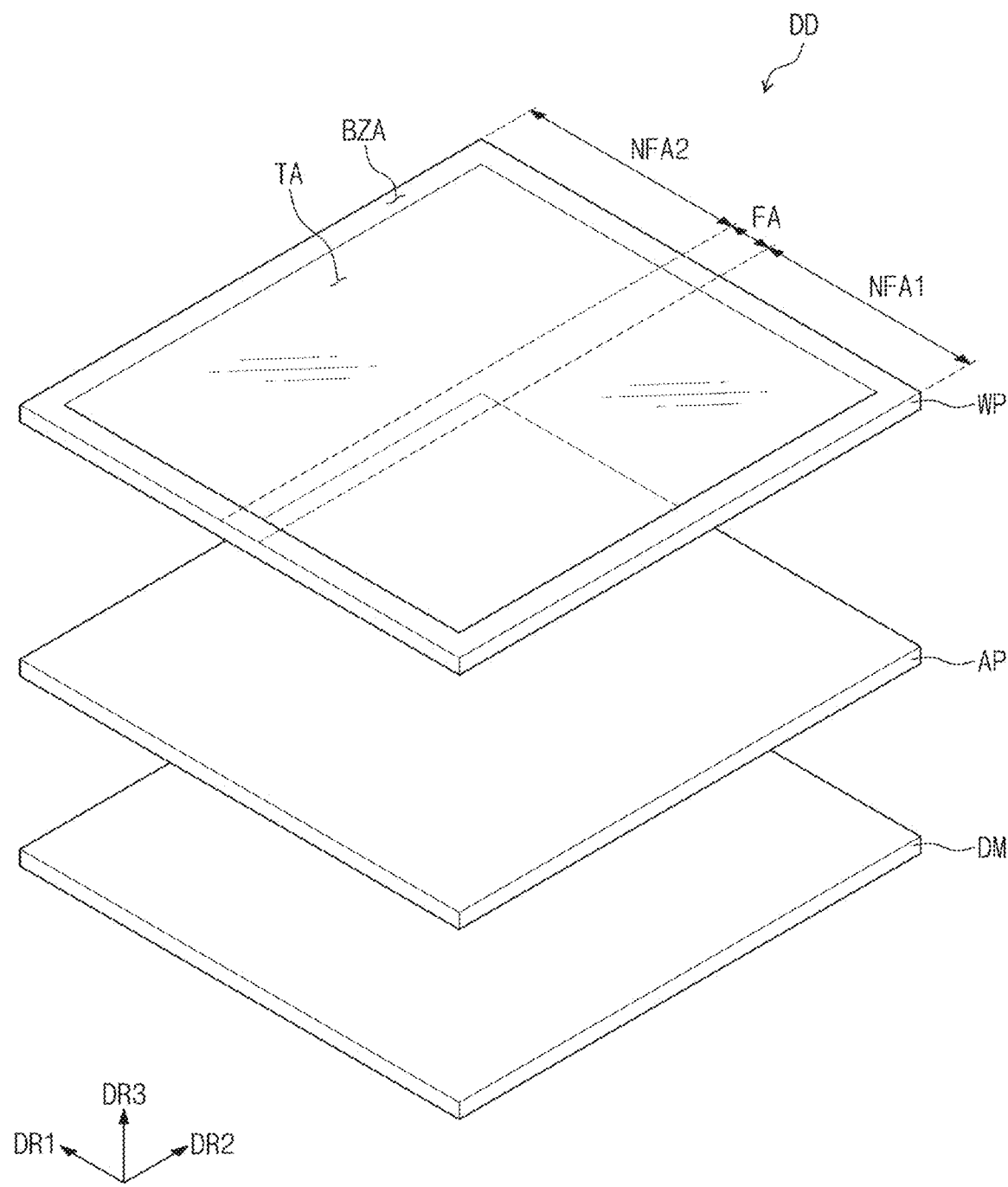
FIG. 2 is an exploded perspective view of an embodiment of a display device according to the invention.
Figure 3:
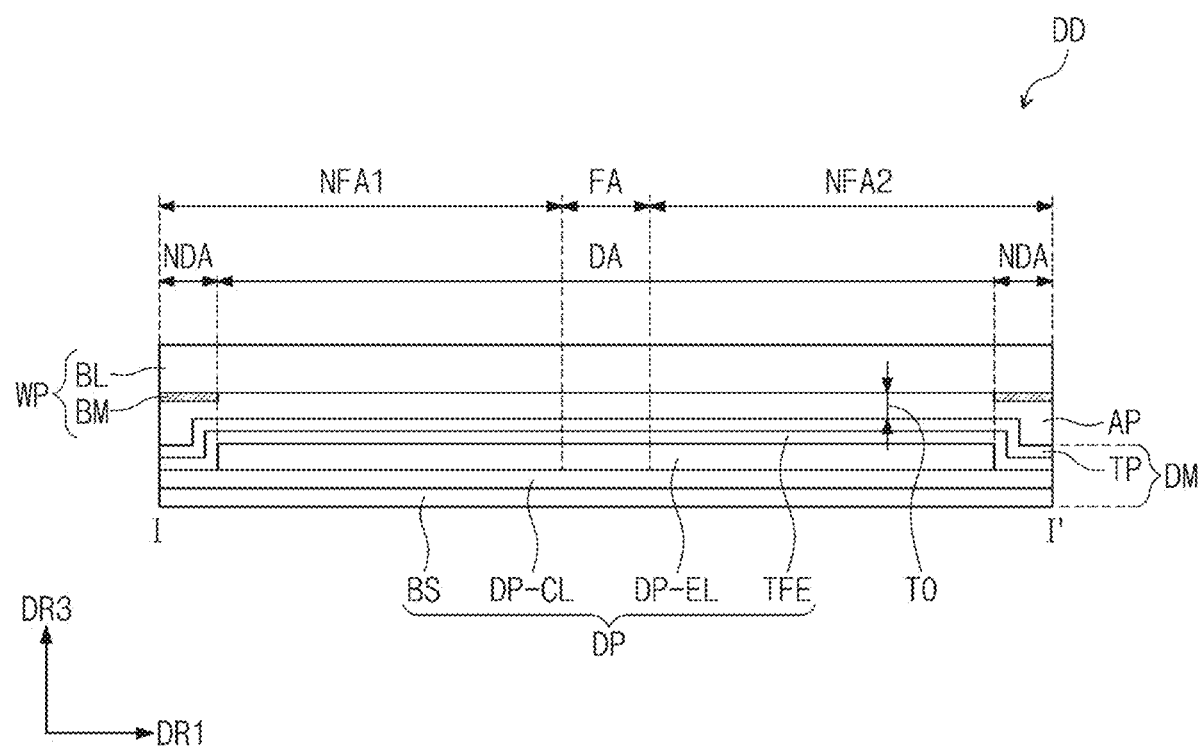
FIG. 3 is a cross-sectional view of an embodiment of a display device according to the invention.

FIG. 2 is an exploded perspective view of an embodiment of the display device DD according to the invention. FIG. 3 is a cross-sectional view of the display device DD according to an embodiment, more particularly, a cross-sectional view taken along line I-I' of FIG. 1.

An embodiment of the display device DD may include a display module DM, and a window WP disposed on the display module DM. In an embodiment of the display device DD, the display module DM may include a display panel DP including a display element layer DP-EL and an input sensing unit TP disposed on the display panel DP. In an embodiment, the display device DD may include an adhesive member AP disposed between the display panel DP and the window WP. In an embodiment, for example, the adhesive member AP may be disposed between the input sensing unit TP and the window WP.

In an embodiment, the adhesive member AP may include a polymer derived from a resin composition. In an embodiment, the resin composition may include at least one (meth) acrylate monomer, at least one urethane (meth)acrylate oligomer, and at least one photoinitiator. In an embodiment, the resin composition may have a viscosity in a range of about 5 centipoise (cP) or greater to less than about 50 cP as measured at a temperature of 25° C. according to JIS K 2283. The resin composition having a viscosity in a range of about 5 cP or greater to less than about 50 cP as measured at a temperature of 25° C. according to JIS K 2283 may be applied by methods such as an inkjet printing method or dispensing application method. The resin composition having a viscosity in a range of about 5 cP or greater to less than about 50 cP as measured at a temperature of 25° C. according to JIS K 2283 may be precisely applied when a resin composition is provided. In such an embodiment, the resin composition having a viscosity in a range of about 5 cP or greater to less than about 50 cP as measured at a temperature of 25° C. according to JIS K 2283 may be provided in a uniform thickness and uniform amount from a device used for applying a resin composition.

The adhesive member AP may have a deformation recovery rate in a range of about 75% or greater to less than about 100% at a temperature of 0° C. or lower and at a temperature of 40° C. or higher. In such an embodiment, the adhesive member AP may have a deformation recovery rate in a range of about 75% or greater to less than about 100% at a temperature of −20° C. In an embodiment, the adhesive member AP may have a deformation recovery rate in a range of about 75% or greater to less than about 100% at a temperature of 60° C. In the disclosure, the deformation recovery rate may be a degree of recovery for a predetermined shear strain. At temperatures of −20° C. and 60° C., the deformation recovery rate of the adhesive member AP may satisfy Equation 1 below.

Equation 11

$$X_2 = [1-(X_1/25)] \times 100\%$$

In Equation 1 above, $X_1$ denotes a shear strain measured 600 seconds after removing a shear stress applied in a way such that the adhesive member AP has a shear strain of 25% at temperatures of −20° C. and 60° C. That is, $X_1$ may be less than about 25%. $X_2$ denotes a deformation recovery rate of the adhesive member AP at temperatures of −20° C. and 60° C., which may be in a range of about 75% or greater to less than about 100%. In Equation 1, when $X_1$ is a value close to 0%, $X_2$ may be a value close to 100%. When $X_2$ represents a value close to 100%, that is, when the deformation recovery rate represents a value close to 100%, the deformation of the adhesive member AP may be almost recovered.

The temperatures of −20° C. and 60° C. may correspond to low-temperature and high-temperature environments. Accordingly, the adhesive member AP having a deformation recovery rate in a range of about 75% or greater to less than about 100% at temperatures of −20° C. and 60° C. may exhibit properties of having high folding reliability and adhesion reliability in low-temperature and high-temperature environments. Accordingly, an embodiment of the display device DD including the adhesive member AP may exhibit high reliability when folding and unfolding are repeated, and may exhibit properties of having improved folding reliability and adhesion reliability in low-temperature and high-temperature environments.

The adhesive member AP may have a first stress relaxation ratio in a range of about 75% or greater to less than about 95% for a shear strain in a range of about 25% at a temperature of 0° C. or lower. In such an embodiment, the adhesive member AP may have a first stress relaxation ratio in a range of about 75% or greater to less than about 95% for a shear strain of 25% at a temperature of −20° C. At a temperature of −20° C., the first stress relaxation ratio of the adhesive member AP may satisfy Equation 2 below.

Equation 2

$$Y_3 = [1-(Y_1/Y_2)] \times 100\%$$

In Equation 2, $Y_1$ denotes a first shear stress measured immediately after a shear strain of 25% is exhibited at a temperature of −20° C. $Y_2$ denotes a second shear stress measured 10 seconds after the shear strain of 25% is exhibited at the temperature of −20° C. The second shear stress may be a shear stress measured 10 seconds after the first shear stress is measured at a temperature of −20° C. In Equation 2, $Y_3$ denotes the first stress relaxation ratio of the adhesive member AP at a temperature of −20° C., which may be in a range of about 75% or greater to less than about 95%.

The adhesive member AP having a stress relaxation ratio in a range of about 75% or greater to less than about 95% at a temperature of −20° C. may have a high stress relaxation rate in a low-temperature environment. In the adhesive member AP having a high stress relaxation rate at a temperature of −0° C., stress may not remain thereinside but be removed when folding and unfolding are repeated. Accordingly, the adhesive member AP may exhibit properties of having high adhesion reliability and folding reliability when folding and unfolding are repeated in a low-temperature environment. An embodiment of the display device DD including the adhesive member AP may exhibit properties of having improved reliability in a low-temperature environment without the lift-off or peeling-off of an adhesive member.

The adhesive member AP may have a second stress relaxation ratio in a range of about 1% or greater to less than about 30% for a shear strain of 25% at a temperature of 40° C. or higher. In such an embodiment, the adhesive member AP may have a second stress relaxation ratio in a range of about 1% or greater to less than about 30% for a shear strain of 25% at a temperature of 60° C. At a temperature of 60° C., the second stress relaxation ratio of the adhesive member AP may satisfy Equation 3 below.

Equation 3

$$Z_3 = [1-(Z_1/Z_2)] \times 100\%$$

In Equation 3, $Z_1$ denotes a third shear stress measured immediately after a shear strain of 25% is exhibited at a temperature of 60° C. $Z_2$ denotes a fourth shear stress measured 10 seconds after the shear strain of 25% is exhibited at a temperature of 60° C. The fourth shear stress may be a shear stress measured 10 seconds after the third shear stress is measured at a temperature of 60° C. $Z_3$ denotes the second stress relaxation ratio of the adhesive member AP at a temperature of 60° C., which may be in a range of about 1% or greater to less than about 30%.

The adhesive member AP having a stress relaxation ratio in a range of about 1% or greater to less than about 30% at a temperature of 60° C. may have a low stress relaxation rate in a high-temperature environment. The adhesive member AP having a stress relaxation ratio in a range of about 1% or greater to less than about 30% at a temperature of 60° C. may maintain reliability when folding and unfolding are repeated in a high-temperature environment. Accordingly, an embodiment of the display device DD including the adhesive member AP may exhibit properties of having improved reliability in a high-temperature environment without the lift-off or peeling-off of an adhesive member.

In an embodiment, the glass transition temperature (Tg) of the adhesive member AP may be in a range of about −70°

C. or greater to less than about −30° C. The adhesive member AP having a glass transition temperature in a range of about −70° C. or greater to less than about −30° C. may exhibit flexible properties even in a low-temperature environment. Accordingly, an embodiment of the display device DD including the adhesive member AP may exhibit high reliability when folding and unfolding are repeated.

The adhesive member AP may have a 180° peel force of about 800 gram force per 25 millimeters (gf/25 mm) or greater at a temperature of 25° C. The 180° peel force of the adhesive member AP may be a peel force for a glass substrate. The adhesive member AP having a 180° peel force of about 800 gf/25 mm or greater may exhibit properties of having high adhesion reliability. The display device DD including the adhesive member AP having a 180° peel force of about 800 gf/25 mm or greater may exhibit high reliability when folding and unfolding are repeated.

The adhesive member AP may include or be formed from a resin composition including at least one (meth)acrylate monomer, at least one urethane (meth)acrylate oligomer, and at least one photoinitiator. The resin composition may include a (meth)acrylate monomer having a weight average molecular weight (Mw) in a range of about 100 to about 500. In such an embodiment, the (meth)acrylate monomer may have a weight average molecular weight (Mw) in a range of about 100 to about 300. The (meth)acrylate monomer of the resin composition may include at least one (meth)acryloyl group. In the specification, the (meth)acryloyl group represents an acryloyl group or a methacryloyl group, and (meth)acryl represents acryl or methacryl.

In the resin composition, the (meth)acrylate monomer may include at least one acryloyl group or at least one methacryloyl group per monomer unit. In an embodiment, for example, the (meth)acrylate monomer may be an acrylate monomer or a methacrylate monomer including one acryloyl group or one methacryloyl group. In the resin composition, the (meth)acrylate monomer may include at least one selected from an alicyclic (meth)acrylate, a hydroxyl group-containing (meth)acrylate, an alkyl (meth)acrylate, and an aromatic (meth)acrylate.

In an embodiment, for example, based on the total weight of the resin composition, the weight of the (meth)acrylate monomer may be about 70 weight percent (wt %) or greater. In such an embodiment, based on the total weight of the resin composition, the weight of the (meth)acrylate monomer may be about 80 wt % or greater. In an embodiment where the resin composition includes one (meth)acrylate monomer, the weight of the one (meth)acrylate monomer may be about 70 wt % or greater based on the total weight of the resin composition. In an embodiment, where the resin composition includes a plurality of (meth)acrylate monomers, the sum of weights of the plurality of (meth)acrylate monomers may be about 70 wt % or greater based on the total weight of the resin composition. However, this is only one embodiment. Based on the total weight of the resin composition, the weight of the (meth)acrylate monomer is not limited thereto.

The resin composition may include at least one urethane (meth)acrylate oligomer. The urethane (meth)acrylate oligomer may include a plurality of acryl groups. The urethane (meth)acrylate oligomer may have a weight average molecular weight in a range of about 10,000 or greater to less than about 40,000. A urethane (meth)acrylate oligomer having a weight average molecular weight of about 10,000 or greater is included in the resin composition while being in the state of an oligomer having a relatively high degree of polymerization and maintains the high degree of polymerization even after photocuring, and thus, may exhibit high peel force properties.

In an embodiment, for example, based on the total weight of the resin composition, the weight of the urethane(meth)acrylate oligomer may be in a range of about 5 wt % to about 20 wt %. In an embodiment where the resin composition includes one urethane (meth)acrylate oligomer, based on the total weight of the resin composition, the weight of the urethane(meth)acrylate oligomer may be in a range of about 5 wt % to about 20 wt %. In an embodiment, where the resin composition includes a plurality of urethane (meth)acrylate oligomers, based on the total weight of the resin composition, the sum of weights of the plurality of urethane(meth)acrylate oligomers may be in a range of about 10 wt % to about 20 wt %. However, this is only one embodiment. Based on the total weight of the resin composition, the weight of the urethane(meth)acrylate oligomer is not limited thereto.

In an embodiment, for example, the resin composition may include at least one selected from light acrylate 2-ethylhexyl-diglycol acrylate ("EHDG-AT"), light acrylate tetrahydrofurfuryl acrylate ("THF-A"), 2-ethylhexyl acrylate ("2-EHA"), 4-hydroxybutyl acrylate ("4-HBA"), and isobornyl acrylate ("IBXA") as the (meth) acrylate monomer. The resin composition may include at least one selected from UN6207 (Negami Chemical Industrial Co., Ltd.), UF-0052 (KYOEISHA CHEMICAL Co., Ltd.), and UV-3700B (Mitsubishi Chemical Co., Ltd.) as the urethane (meth)acrylate oligomer. However, this is only one embodiment, and the embodiments of the invention are not limited thereto.

The resin composition may include at least one photoinitiator. In an embodiment where the resin composition includes a plurality of photoinitiators, different photoinitiators may be activated by ultraviolet light with different center wavelengths.

In an embodiment, for example, the photoinitiator may include at least one selected from 2,2-dimethoxy-1,2-diphenylethan-1-one, 1-hydroxy-cyclohexyl-phenyl-ketone, 2-hydroxy-2-methyl-1-phenyl-1-propanone, 2-hydroxy-1-[4-(2- hydroxyethoxy)phenyl]-2-methyl-1-propanone, and 2-hydroxy-1-{4-[4-(2-hydroxy-2-methyl-propionyl)-benzyl]-phenyl}-2-methylpropan-1-one.

In an embodiment, the photoinitiator may include at least one selected from 2-methyl-1[4-(methylthio)phenyl]-2-morpholinopropan-1-one, 2-benzyl-2-dimethylamino-1-(4-morpholinophenyl)-butanone-1, 2-dimethylamino-2-(4-methylbenzyl)-1-(4-morpholin-4-yl-phenyl)-butan-1-one, 2,4,6-trimethylbenzoyl-diphenylphosphine oxide, ethyl(2,4,6-trimethylbenzoyl)phenyl phosphinate, bis(2,4,6-trimethylbenzoyl)-phenylphosphineoxide, [1-(4-phenylsulfanylbenzoyl) heptylideneamino]benzoate, [1-[9-ethyl-6-(2-methylbenzoyl) carbazol-3-yl]ethylideneamino] acetate, and bis(2,4-cyclopentadienyl) bis[2,6-difluoro-3-(1-pyrryl)phenyl] titanium(IV). In an embodiment, the resin composition may include at least one selected from Omnirad TPO-H (IGM Resins Co., Ltd.), Omnirad819 (IGM Resins Co., Ltd.), and Esacure 3644 (IGM Resins Co., Ltd.) as the photoinitiator.

A liquid resin composition is cured by the radiation of ultraviolet light, and may be formed as the adhesive member AP after the curing. The adhesive member AP may have a deformation recovery rate in a range of about 75% or greater to less than about 100% for a shear strain of 25% at temperatures of −20° C. and 60° C. The adhesive member AP may have a first stress relaxation ratio (after 10 seconds)

in a range of about 70% or greater to less than about 95% for a shear strain of 25% at a temperature of −20° C. The adhesive member AP may have a second stress relaxation ratio (after 10 seconds) in a range of about 1% or greater to less than about 30% for a shear strain of 25% at a temperature of 60° C. Accordingly, an embodiment of the adhesive member AP according to the invention may exhibit high adhesion reliability and high folding reliability in low-temperature and high-temperature environments.

The display panel DP may include a base substrate BS, a circuit layer DP-CL disposed on the base substrate BS, a display element layer DP-EL disposed on the circuit layer DP-CL, and an encapsulation layer TFE covering the display element layer DP-EL. In an embodiment, for example, the display panel DP may include a plurality of organic light emitting elements or a plurality of quantum dot light emitting elements in the display element layer DP-EL.

FIG. 3 shows an embodiment of the configuration of the display panel DP illustrated in FIG. 3 and the like, but the configuration of the display panel DP is not limited thereto. In an alternative embodiment, for example, the display panel DP may include a liquid crystal element, in which case the encapsulation layer TFE may be omitted.

The input sensing unit TP may be disposed on the display panel DP. In an alternative embodiment, for example, the input sensing unit TP may be directly disposed on the encapsulation layer TFE of the display panel DP. The input sensing unit TP senses an external input and changes the same into a predetermined input signal, and may provide the input signal to the display panel DP. In an embodiment of the display device DD, for example, the input sensing unit TP may be a touch sensing unit configured to sense a touch. The input sensing unit TP may recognize a direct touch of a user, an indirect touch of a user, a direct touch of an object, an indirect touch of an object, or the like.

In an embodiment, the input sensing unit TP may sense at least one selected from the position of a touch and the intensity (pressure) of a touch, which are applied externally. In an embodiment, the input sensing unit TP may have various configurations, or may include or be composed of various materials, and is not limited to any one embodiment. The input sensing unit TP may include a plurality of sensing electrodes (now shown) configured to sense an external input. The sensing electrodes (not shown) may sense an external input in an electrostatic capacitive manner The display panel DP is provided with an input signal from the input sensing unit TP, and may generate an image corresponding to the input signal.

The window WP may protect the display panel DP, the input sensing unit TP, and the like. The image IM generated in the display panel DP may transmit the window WP and be provided to a user. The window WP may provide a touch surface of the display device DD. In the display device DD including the folding region FA, the window WP may be a flexible window.

The window WP may include a base layer BL and a print layer BM. The window WP may include a transmissive region TA and a bezel region BZA. The front surface of the window WP including the transmissive region TA and the bezel region BZA corresponds to the front surface of the display device DD.

The transmissive region TA may be an optically transparent region. The bezel region BZA may be a region having a relatively low light transmittance compared to the transmissive region TA. The bezel region BZA may have a predetermined color. The bezel region BZA is adjacent to the transmissive region TA, and may surround the transmissive region TA. The bezel region BZA may define the shape of the transmissive region TA. However, the embodiments are not limited to the embodiment shown in FIG. 2. Alternatively, the bezel region BZA may be disposed adjacent to only one side of the transmissive region TA, or a portion of the bezel region BZA may be omitted.

The base layer BL may include a glass or plastic substrate. In an alternative embodiment, for example, a tempered glass substrate may be used as the base layer BL. Alternatively, the base layer BL may be formed of a polymer resin having flexibility. In an alternative embodiment, for example, the base layer BL may include or be made of polyimide, polyacrylate, polymethylmethacrylate, polycarbonate, polyethylenenaphthalate, polyvinylidene chloride, polyvinylidene difluorid, polystyrene, an ethylene vinylalcohol copolymer, or a combination thereof. However, the embodiments of the invention are not limited thereto. Any common type known as the base layer BL of the window WP in the art may be used without limitation.

The print layer BM may be disposed on one surface of the base layer BL. In an embodiment, the print layer BM may be provided on a lower surface of the base layer BL which is adjacent to the display module DM. The print layer BM may be disposed in an edge region of the base layer BL. The print layer BM may be an ink print layer. In an embodiment, the print layer BM may be a layer formed by including a pigment or a dye. In the window WP, the bezel region BZA may be a portion in which the print layer BM is provided.

In an embodiment, the window WP may further include at least one functional layer (not shown) provided on the base layer BL. In an alternative embodiment, for example, the functional layer (not shown) may be a hard coating layer, an anti-fingerprint layer, and the like, but the embodiment of the invention is not limited thereto.

In an embodiment a step (or a stepped structure) may be defined between a portion in which the print layer BM is provided and the base layer BL in which the print layer BM is not provided. An embodiment of the adhesive member AP formed from the resin composition described above has a low storage modulus and a high adhesion force value, and thus, may be attached to the window WP without being separated at the step portion.

In an embodiment, the adhesive member AP included in the display device DD may be formed by providing a liquid resin composition on one surface of the window WP or one surface of the display module DM, and ultraviolet curing the liquid resin composition provided between the window WP and the display module DM. The one surface of the display module DM may be an upper surface or a lower surface of the display module DM, or may be one surface (e.g., an upper surface or a lower surface) of the display panel DP included in the display module DM.

In an alternative embodiment, the adhesive member AP may be provided by ultraviolet curing a liquid resin composition in a separate process to provide the adhesive member AP, followed by laminating one surface of the cured adhesive member AP in the form of an adhesive film on one surface of the window WP or one surface of the display module DM, and then attaching unattached one surface of the window WP or unattached one surface of the display module DM to the other surface of the adhesive member AP.

A thickness TO of the adhesive member AP may be in a range of about 50 micrometers (μm) to about 200 μm. In an embodiment, for example, the adhesive member AP may have the thickness TO of about 50 μm to about 100 μm. However, this is one embodiment. The thickness TO of the adhesive member AP is not limited thereto.

Figure 4A:
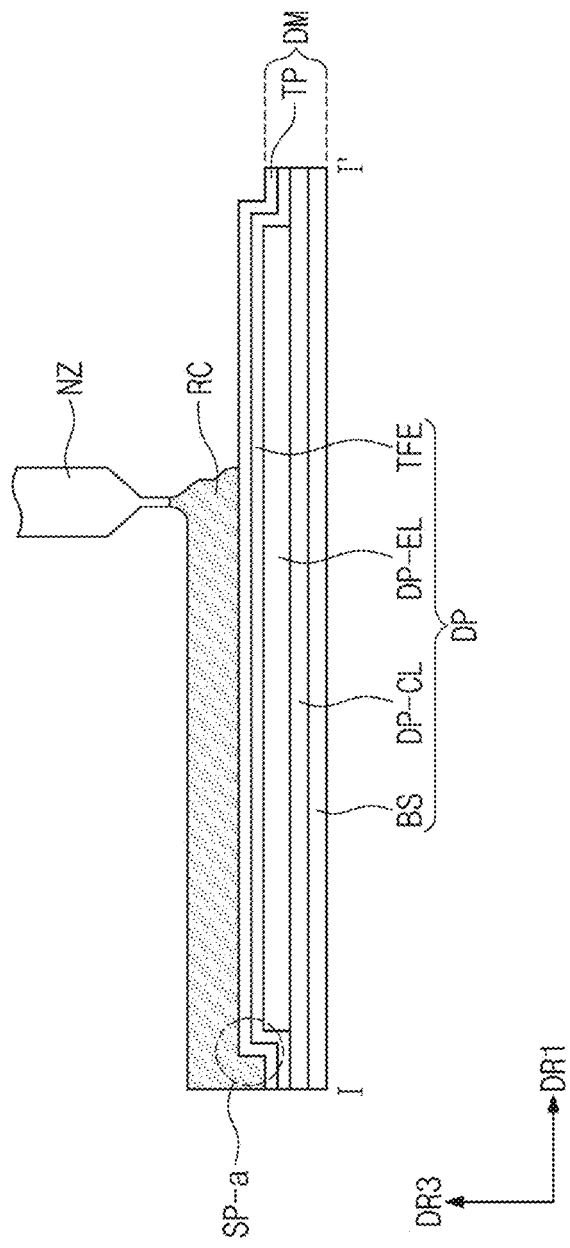
FIG. 4A is a view showing an embodiment of a method for preparing an adhesive member according to the invention.
Figure 4B:
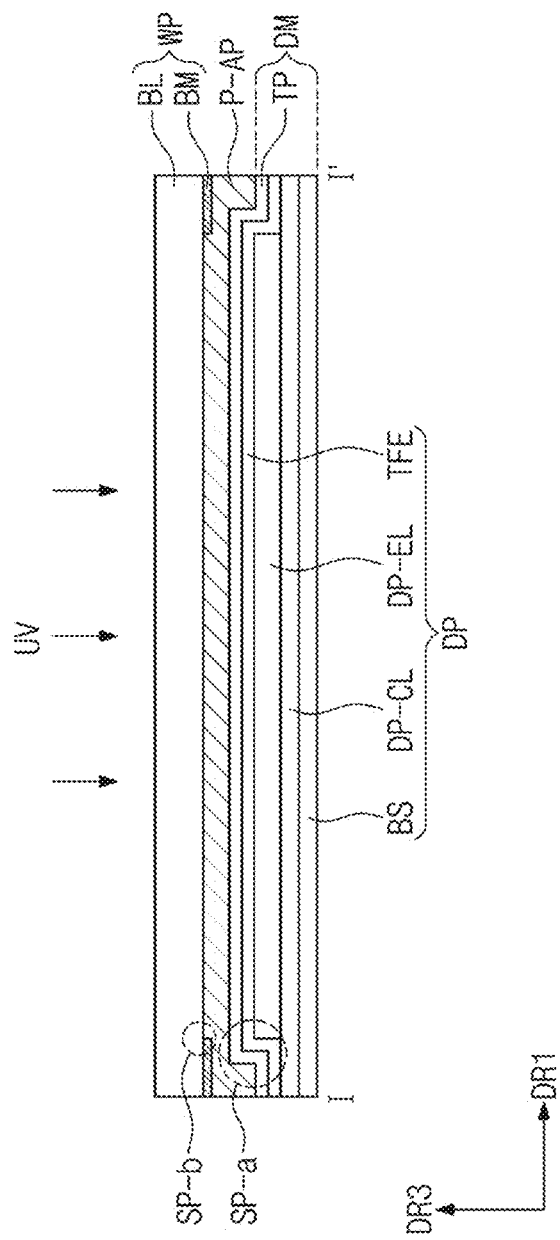
FIG. 4B is a view showing an embodiment of a method for preparing an adhesive member according to the invention.

FIG. 4A and FIG. 4B are views schematically showing an embodiment of a method for preparing the adhesive member AP according to the invention. FIG. 4A shows a process of providing a resin composition RC on the display module DM. FIG. 4B shows a process of irradiating a preliminary adhesive member P-AP formed from the resin composition RC with ultraviolet light.

Referring to FIG. 4A, a liquid resin composition RC may be provided between the display module DM and the window WP. The resin composition RC may include at least one (meth)acrylate monomer, at least one urethane (meth) acrylate oligomer, and at least one photoinitiator. In an embodiment, the resin composition RC may further include an organic solvent.

The resin composition RC has a viscosity in a range of about 5 cP or greater to less than about 50 cP as measured at a temperature of 25° C. according to JIS K 2283, and may be provided through a nozzle NZ. The resin composition RC having a viscosity in a range of about 5 cP or greater to less than about 50 cP exhibits properties of being easily discharged from the nozzle NZ, and may be effectively applied in a uniform thickness. In such an embodiment, the resin composition RC may be provided on the display module DM such that a preliminary adhesive member P-AP may be formed.

The resin composition RC having a viscosity in a range of about 5 cP or greater to less than about 50 cP as measured at a temperature of 25° C. according to JIS K 2283 may be provided while covering an irregular portion including a step portion SP-a of the display module DM. Since the resin composition RC has a low viscosity value of less than about 50 cP, the resin composition RC may be applied without leaving an empty space in an irregular portion such as the step portion SP-a. In an embodiment, the resin composition RC having a viscosity value of about 5 cP or greater may be uniformly applied to a predetermined thickness in a portion to which the resin composition RC is to be provided, that is, without flowing out of the display module DM.

In an embodiment, the window WP may be provided on the preliminary adhesive member P-AP provided by applying the resin composition RC to a predetermined thickness. Ultraviolet light UV for curing the resin composition RC may transmit the window WP and be provided to the resin composition RC. When the window WP is provided on the preliminary adhesive member P-AP, the resin composition RC may fill a step portion SP-b without leaving an empty space. That is, since the resin composition RC has a low viscosity value of less than about 50 cP, the preliminary adhesive member P-AP may be provided in an irregular portion such as the step portion SP-b between the base layer BL and the print layer BM while covering the shape of the irregular portion. The preliminary adhesive member P-AP may be polymerized and then cured by the provided ultraviolet light UV to be formed as the adhesive member AP. A final adhesive member AP (see FIG. 3) provided to the display device DD (see FIG. 3) may have a 180° peel force of about 800 gf/25 mm or greater at a temperature of 25° C. The adhesive member AP (see FIG. 3) may have a deformation recovery rate in a range of about 75% or greater to less than about 100% for a shear strain of 25% at temperatures of −20° C. and 60° C. The adhesive member AP (see FIG. 3) may have a first stress relaxation ratio (after 10 seconds) in a range of about 70% or greater to less than about 95% for a shear strain of 25% at a temperature of −20° C. The adhesive member AP (see FIG. 3) may have a second stress relaxation ratio (after 10 seconds) in a range of about 1% or greater to less than about 30% for a shear strain of 25% at a temperature of 60° C.

Alternatively, the ultraviolet light UV may be provided to the preliminary adhesive member P-AP before the window WP is provided on the preliminary adhesive member P-AP, so that a polymerization reaction may proceed in the resin composition RC. The amount of radiated ultraviolet light UV may be an amount of light which may completely cure the resin composition RC. In another alternative embodiment, the resin composition RC may be partially subjected to a polymerization reaction while being in the state of the preliminary adhesive member P-AP, and then after the window WP is covered, unreacted resin composition RC may be further reacted to form the final adhesive member AP.

Figure 5A:
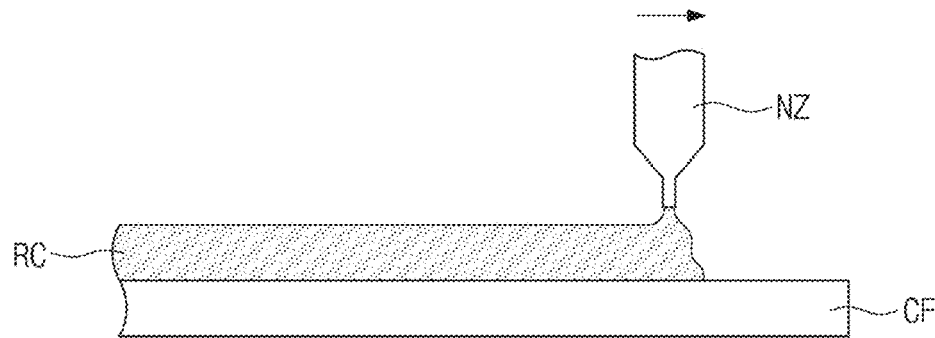
FIG. 5A is a view showing an embodiment of a method for preparing an adhesive member according to the invention.
Figure 5B:
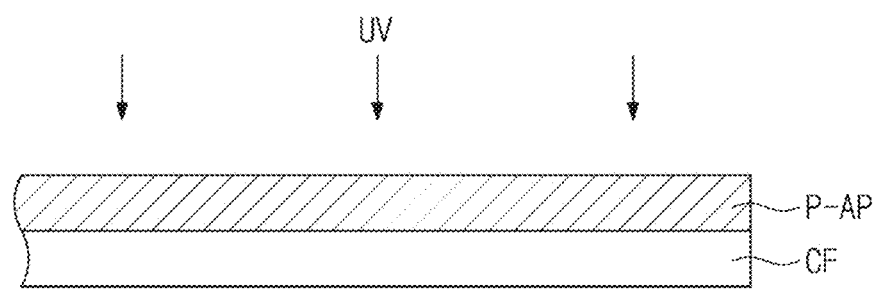
FIG. 5B is a view showing an embodiment of a method for preparing an adhesive member according to the invention.
Figure 5C:
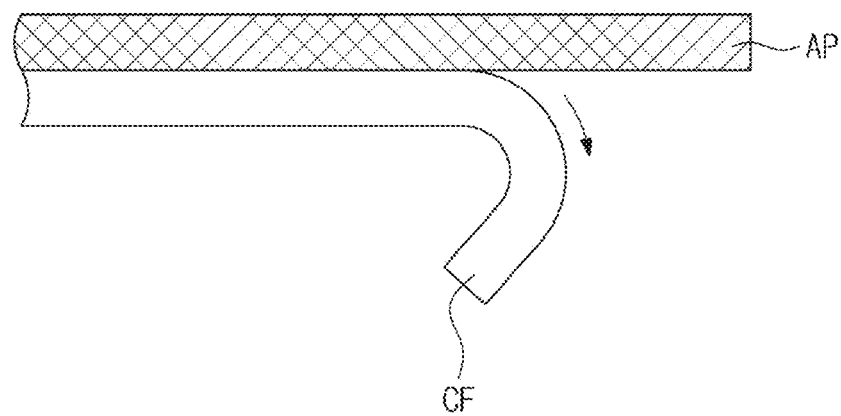
FIG. 5C is a view showing an embodiment of a method for preparing an adhesive member according to the invention.

FIG. 5A to FIG. 5C show processes of preparing an adhesive member AP which is prepared by a method different from the method for preparing the adhesive member AP described with reference to FIG. 4A and FIG. 4B, and then provided to the display device DD. FIG. 5A shows a process of providing a resin composition RC for forming the adhesive member AP, FIG. 5B shows a process of radiating ultraviolet light, and FIG. 5C shows a process of removing a carrier film CF.

Referring to FIG. 5A to FIG. 5C, in an embodiment, the resin composition RC may be provided on the carrier film CF. In an embodiment, for example, a polyethylene terephthalate ("PET") film and the like may be used as the carrier film CF, but the embodiments of the invention are not limited thereto. The carrier film CF serves as a substrate for coating a liquid resin composition RC, and any other film which may be easily detached from the adhesive member AP after ultraviolet curing may be used as the carrier film CF. In an embodiment, for example, one surface of the carrier film CF on which the resin composition RC is provided may be release-treated.

The resin composition RC may be provided by a method such as an inkjet printing method or a dispensing application method. In an embodiment, the resin composition RC has a viscosity value in a range of about 5 cP or greater to less than about 50 cP at a temperature of about 25° C., and thus, may be easily discharged from the nozzle NZ and the like, and may be effectively applied to have a uniform thickness.

A preliminary adhesive member P-AP provided by coating the resin composition RC to a predetermined thickness may be irradiated with ultraviolet light UV. FIG. 5B illustrates that the coated preliminary adhesive member P-AP is directly irradiated with the ultraviolet light UV, but the embodiments of the invention are not limited thereto. In an alternative embodiment, an auxiliary carrier film (not shown) may be further disposed on the preliminary adhesive member P-AP, and the auxiliary carrier film (not shown) transmits ultraviolet light and may cover the preliminary adhesive member P-AP during an ultraviolet curing process.

The adhesive member AP may be formed after the ultraviolet curing. The adhesive member AP finally prepared by removing the carrier film CF used during the process may have a 180° peel force of about 800 gf/25 mm or greater at a temperature of 25° C. The adhesive member AP may have a deformation recovery rate in a range of about 75% or greater to less than about100% for a shear strain of 25% at temperatures of −20° C. and 60° C. The adhesive member AP may have a first stress relaxation ratio (about after 10 seconds) in a range of about 70% or greater to less than about 95% for a shear strain of 25% at a temperature of −20° C. The adhesive member AP may have a second stress relaxation ratio (after 10 seconds) in a range of about 1% or greater to less than about 30% for a shear strain of 25% at a temperature of 60° C.

The adhesive member AP prepared through the processes of FIG. 5A to FIG. 5C may be applied to the display device DD. In an embodiment, for example, one surface of the adhesive member AP may be attached on the display module DM, and then the window WP may be subsequently attached on the other surface of the adhesive member AP which faces the one surface of the adhesive member AP attached to the display module DM. Alternatively, one surface of the adhesive member AP may be attached on one surface of the window WP, which is to face the display module DM, and then the other surface of the adhesive member AP which faces the one surface of the adhesive member AP attached to the window WP may be attached to the display module DM to provide the adhesive member AP to the display device DD.

In an embodiment, the adhesive member AP may include a polymer derived from the resin composition RC. In an embodiment, the display device DD including the adhesive member AP may use the adhesive member AP to maintain the state in which the window WP, the display module DM, and the like are adhered without the lift-off of the adhesive member AP even in a folded state or in a bent region.

Figure 6:
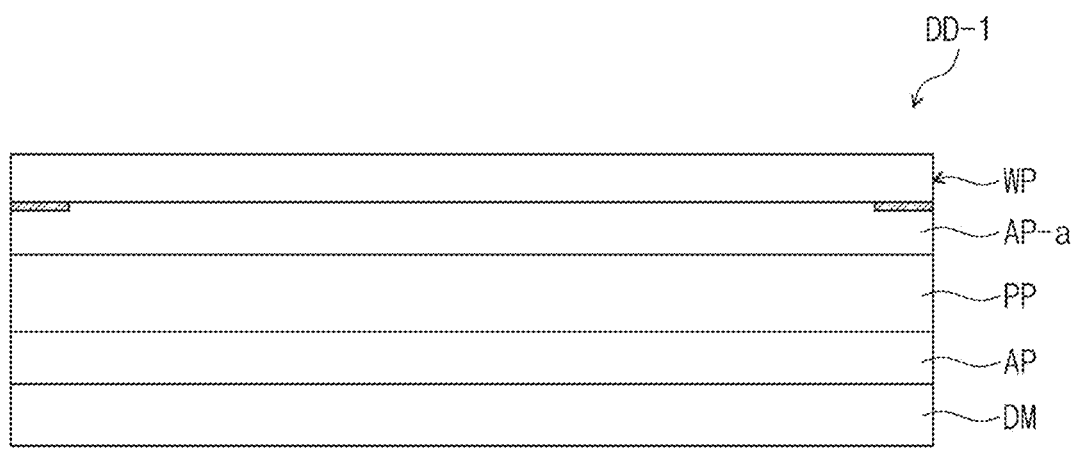
FIG. 6 is a cross-sectional view of an embodiment of a display device according to the invention.

FIG. 6 is a cross-sectional view showing an embodiment of a display device according to the invention. Hereinafter, any repetitive detailed description of the same or like contents of the display device in FIG. 6 as those described above with reference to FIG. 1A to FIG. 5C will be omitted or simplified, and differences will be mainly described.

In an embodiment, as shown in FIG. 6, a display device DD-1 may further include a light control layer PP and an optical adhesive layer AP-a. In such an embodiment, the display device DD-1 may further include the light control layer PP disposed between the adhesive member AP and the window WP, and the optical adhesive layer AP-a disposed between the light control layer PP and the window WP.

The light control layer PP may be disposed on the display panel DP to control reflective light in the display panel DP caused by external light. The light control layer PP may include, for example, a polarizing plate or a color filter layer.

The optical adhesive layer AP-a may be an optically clear adhesive ("OCA") film or an optically clear resin ("OCR") layer. The optical adhesive layer AP-a may also include or be formed from the resin composition of the adhesive member AP (see FIG. 3) described above. In such an embodiment, the optical adhesive layer AP-a may include a polymer derived from the resin composition RC having a viscosity in a range of about 5 cP or greater to less than about 50 cP as measured at a temperature of 25° C. according to JIS K 2283.

In an embodiment, the optical adhesive layer AP-a formed from the resin composition RC may have a 180° peel force of about 800 gf/25 mm or greater at a temperature of 25° C. The optical adhesive layer AP-a may have a deformation recovery rate in a range of about 75% or greater to less than about 100% for a shear strain of 25% at temperatures of −20° C. and 60° C. The optical adhesive layer AP-a may have a first stress relaxation ratio (after 10 seconds) in a range of about 70% or greater to less than about 95% for a shear strain of 25% at a temperature of −20° C. The optical adhesive layer AP-a may have a second stress relaxation ratio (after 10 seconds) in a range of about 1% or greater to less than about 30% for a shear strain of 25% at a temperature of 60° C. Accordingly, the optical adhesive layer AP-a may have improved reliability in high-temperature and low-temperature environments. The optical adhesive layer AP-a disposed between the light control layer PP and the window WP may exhibit properties of having high adhesion reliability. In such an embodiment, the display device DD-1 including the optical adhesive layer AP-a and the adhesive member AP may exhibit high reliability even when folding and unfolding are repeated.

Figure 7:
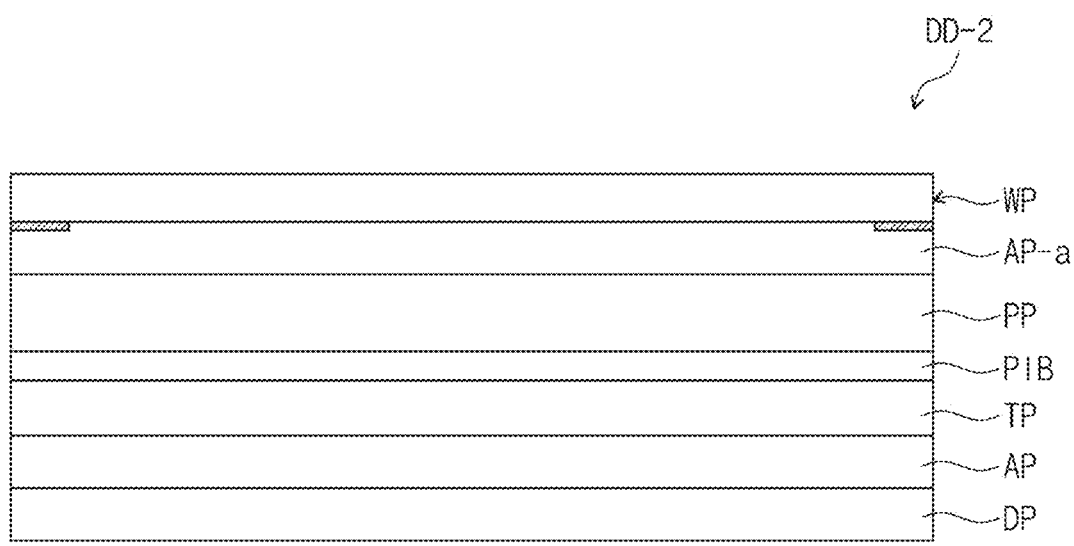
FIG. 7 is a cross-sectional view of an embodiment of a display device according to the invention.

FIG. 7 is a cross-sectional view showing an embodiment of a display device according to the invention. Hereinafter, any repetitive detailed description of the same or like contents of the display device in FIG. 7 as those described above with reference to FIG. 1A to FIG. 6 will be omitted or simplified, and differences will be mainly described.

In an alternative embodiment, as shown in FIG. 7, a display device DD-2 may further include the light control layer PP, the optical adhesive layer AP-a, and an interlayer adhesive layer PIB. In such an embodiment, the display device DD-2 may further include the light control layer PP disposed between the adhesive member AP and the window WP, and the optical adhesive layer AP-a disposed between the light control layer PP and the window WP, as in an embodiment of the display device DD-1 illustrated in FIG. 6.

In an embodiment of the display device DD-2, the adhesive member AP may be provided between the display panel DP and the input sensing unit TP. In such an embodiment, the input sensing unit TP is not directly disposed on the display panel DP, but instead, the display panel DP and the input sensing unit TP may be coupled by the adhesive member AP. In an embodiment, for example, the adhesive member AP may be disposed between the encapsulation layer TFE (see FIG. 3) of the display panel DP and the input sensing unit TP.

In such an embodiment, the interlayer adhesive layer PIB may be provided below the light control layer PP. The interlayer adhesive layer PIB is disposed between the input sensing unit TP and the light control layer PP, and may include or be formed of an adhesive material having high moisture permeability prevention properties. In an embodiment, for example, the interlayer adhesive layer PIB may be formed by including polyisobutylene. The interlayer adhesive layer PIB may be disposed on the input sensing unit TP to prevent the corrosion of sensing electrodes of the input sensing unit TP. In an embodiment, the display device DD-2 includes the optical adhesive layer AP-a and the adhesive member AP including or formed from the resin composition RC described above, and the display device DD-2 including the optical adhesive layer AP-a and the adhesive member AP may exhibit high reliability when folding and unfolding are repeated.

Hereinafter, referring to Examples and Comparative Examples, an adhesive member and a display device formed from the resin composition according to an embodiment of the invention will be described in detail. In addition, Examples below are for illustrative purposes only to facilitate the understanding of embodiments of the invention, and thus, embodiments of the invention are not limited thereto.

EXAMPLES

1. Resin Composition Preparation

Resin compositions of Examples and Comparative Examples were prepared according to blending ratios listed in Tables 1 and 2. Materials listed in Tables 1 and 2 were provided to a heat-resistant light-shielding container in respective weight ratios. In addition, as a photoinitiator, Omnirad TPO-H (IGM Resin Co., Ltd.), Esacure 3644 (IGM Resin Co., Ltd.), Photomer4250 (IGM Resin Co., Ltd.), and Omnirad819 (IGM Resin Co., Ltd.) were mixed in a weight ratio of 60:10:1:30 and provided in an amount of 2 wt % based on the total weight of a resin composition. Thereafter, the resin compositions of Examples and Comparative Examples were respectively prepared by stirring at 1000 rounds per minute (rpm) for 30 minutes using a co-rotating type stirring and defoaming device (a product of SHASHIN KAGAKU Co., Ltd.) such that the composition is uniformly mixed.

Data on Photopolymerization Initiators

Omnirad TPO-H: (2,4,6-trimethylbenzoyl)-diphenylphosphine oxide (self-cleavage type radical polymerization initiator, IGM Resins Co., Ltd.)

Esacure 3644: ketocumarine (hydrogen-drawing type radical polymerization initiator, IGM Resins Co., Ltd.)

Photomer4250: hexahydro-1H-azepinacid-2,2-bis[[(1-oxo-2-prophenyl)-oxy]methyl]butyl (curing accelerator, IGM Resins Co., Ltd.)

Omnirad819: phenylbis(2,4,6-trimethylbenzoyl)phosphine oxide (self-cleavage type radical polymerization initiator, IGM Resins Co., Ltd.)

TABLE 1

| Materials | Example 1 | Example 2 | Example 3 | Example 4 |
|---|---|---|---|---|
| Light acrylate EHDG-AT | 10 | 10 | 10 | 40 |
| 2-EHA | 70 | 50 | 70 | 40 |
| 4-HBA | 5 | 20 | 5 | 10 |
| Light acrylate THF-A | 10 | 10 | 5 | — |
| UN6207 | 5 | 5 | 5 | 10 |
| UV-3700B | — | 5 | — | — |
| UF-C052 | — | — | 5 | — |

TABLE 2

| Materials | Comparative Example 1 | Comparative Example 2 | Comparative Example 3 | Comparative Example 4 |
|---|---|---|---|---|
| Light acrylate EHDG-AT | — | — | 70 | — |
| 2-EHA | 69 | 60 | 10 | 35 |
| 4-HBA | 30 | — | — | 40 |
| Light acrylate THF-A | — | — | 10 | — |
| IBXA | — | 30 | — | — |
| UN6207 | — | 10 | — | 25 |
| UV-3700B | 1 | — | — | — |
| UF-C052 | — | — | 10 | — |

Data on the Materials of Table 1 and Table 2

Light acrylate EHDG-AT: 2-ethylhexyl-diglycol acrylate, (KYOEISHA CHEMICAL Co., LTD), molecular weight 272

2-EHA: 2-ethylhexyl acrylate, (Mitsubishi Chemical), molecular weight 184

4-HBA: 4-hydroxybutyl acrylate, (OSAKA ORGANIC CHEMICAL INDUSTRY LTD.), molecular weight 144

Light acrylate THF-A: tetrahydrofurfuryl acrylate, (KYOEISHA CHEMICAL Co., LTD), molecular weight 156

IBXA: isobornyl acrylate, (OSAKA ORGANIC CHEMICAL INDUSTRY LTD.), molecular weight 208

UN6207: urethane acrylate with a molecular weight of 27000 (Negami Chemical Industrial Co., Ltd.)

UV-3700B: urethane acrylate with a molecular weight of 38000 (Mitsubishi Chemical)

UF-0052: Urethane acrylate with a molecular weight of 10000 (KYOEISHA CHEMICAL CO., LTD.)

In Tables 1 and 2, light acrylate EHDG-AT. 2-EHA, 4-HBA, and light acrylate THF-A correspond to (meth)acrylate monomers. UN6207, UV-3700B, and UF-0052 correspond to urethane (meth)acrylate oligomers.

2. Resin Composition and Adhesive Member Evaluation

Table 3 below shows the evaluation of the viscosity and inkjet printing providing of the resin composition of each of Examples 1 to 4 of Table 1, and the glass transition temperature, stress relaxation ratio, deformation recovery rate, folding reliability, and peel force of the adhesive member. Table 4 shows the evaluation of the viscosity and inkjet printing providing of the resin composition of each of Comparative Examples 1 to 4 of Table 2, and the glass transition temperature, stress relaxation ratio, deformation recovery rate, peel force, folding reliability, and durability of the adhesive member. The inkjet printing providing of the resin composition was to evaluate whether it is possible to uniformly provide the resin composition by an inkjet printing method, and each of the stress relaxation ratio and the deformation recovery rate were evaluated at temperatures of −20° C. and 60° C. Hereinafter, the evaluation methods will be described in detail.

Evaluation of Viscosity of Resin Composition

The viscosity of a resin composition described herein was measured at a temperature of 25° C. according to JIS K 2283. The viscosity of each of the resin compositions was measured under the rate condition of a 10 rpm using a viscometer TVE-25L (TOKI SANGYO Co. Ltd.).

Inkjet Printing Providing of Resin Composition

Each of the prepared resin compositions was applied using an inkjet printer and cured by being provided with ultraviolet ("UV") light. The appearance of a cured product after the curing was observed with the naked eye. In Table 3 and Table 4, when the resin composition was discharged to be applied to a uniform thickness, it is denoted by "⊚" and when the resin composition was not discharged, it is denoted by "X."

Measurement of Glass Transition Temperature of Adhesive Member

On a slide glass (a product of Matsunami Glass Ind., Ltd., slide glass S1112), a release-treated PET film (a product of PANAC Co., Ltd., NP100A), and a silicon rubber sheet (a product of TIGERS POLYMER CORPORATION) having a hole with a diameter of 8 millimeters (mm) were sequentially laminated. 28 microliters (μL) of the resin composition of each of Examples and Comparative Examples was dropped into the hole of the silicon rubber, and using UV light emitting diode ("LED") lamps respectively having peaks at wavelengths of 405 nanometers (nm) and 365 nm, UV light was radiated such that accumulated amounts of light were respectively 220 millijoule per square centimeter (mJ/cm$^2$) and 380 mJ/cm$^2$. Thereafter, a release-treated PET film (a product of PANAC Co., Ltd., NP100A) and a slide glass (a product of Matsunami Glass Ind., Ltd., slide glass S1112) were sequentially laminated. After the irradiation, the resin composition was cured by radiating UV light on the side of the laminated slide glass using a UV LED lamp having a peak at a wavelength of 395 nm such that an accumulated amount of light was 4000 mJ/cm$^2$ to obtain a measurement sample with a diameter of 8 mm and a thickness of 500 μm. The glass transition temperature (Tg) of the obtained measurement sample was measured using a dynamic viscoelasticity measuring device (a product of Anton Paar Japan K.K., MCR302). The glass transition temperature was measured under the measurement conditions of a frequency of 1 hertz (Hz), a temperature range of −80° C. to 80° C., and a temperature raising rate of 10° C./min.

Measurement of Stress Relaxation Ratio of Adhesive Member

A measurement sample with a diameter of 8 mm and a thickness of 500 μm was obtained in the same manner as in the glass transition temperature measurement of the adhesive member. The stress relaxation ratio of the obtained measurement sample at a temperature of −20° C. and the stress relaxation ratio of the same at a temperature of 60° C. were measured using a dynamic viscoelasticity measuring device (a product of Anton Paar Japan K.K., MCR302). A neutral force of 1 newton (N) was applied to the measurement sample and a shear strain of 25% was maintained for 10 seconds. The stress relaxation ratio at a temperature of −20° C. was calculated using Equation 2 below, and the stress relaxation ratio at a temperature of 60° C. was calculated using Equation 3 below.

Equation 2

$$Y_3=[1-(Y_1/Y_2)]\times 100\%$$

In Equation 2, $Y_1$ denotes a first shear stress measured immediately after a shear strain of 25% is exhibited at a temperature of −20° C., $Y_2$ denotes a second shear stress measured 10 seconds after a shear strain of 25% is exhibited at a temperature of −20° C., and $Y_3$ denotes a stress relaxation ratio at a temperature of −20° C.

Equation 3

$$Z_3=[1-(Z_1/Z_2)]\times 100\%$$

In Equation 3, $Z^1$ denotes a third shear stress measured immediately after a shear strain of 25% is exhibited at a temperature of 60° C., $Z_2$ denotes a fourth shear stress measured 10 seconds after a shear strain of 25% is exhibited at a temperature of 60° C., and $Z_3$ denotes a stress relaxation ratio at a temperature of 60° C.

Measurement of Deformation Recovery Rate of Adhesive Member

A measurement sample with a diameter of 8 mm and a thickness of 500 μm was obtained in the same manner as in the stress relaxation ratio measurement of the adhesive member. The deformation recovery rate of the obtained measurement sample at a temperature of −20° C. and the deformation recovery rate of the same at a temperature of 60° C. were measured using a dynamic viscoelasticity measuring device (a product of Anton Paar Japan K.K., MCR302). When the shear strain of the obtained measurement sample was 25%, the shear strain was measured 600 seconds after setting the shear stress to 0. Using Equation 1 below, the deformation recovery rate at temperatures of −20° C. and 60° C. were calculated.

Equation 1

$$X_2=[1-(X_1/25)]\times 100\%$$

In Equation 1, $X_1$ denotes a shear strain measured by the above-described method at temperatures of −20° C. and 60° C., and $X_2$ denotes a deformation recovery rate at temperatures of −° C. and 60° C.

Measurement of Peel Force of Adhesive Member

Each of the resin compositions of Examples and Comparative

Examples was applied on a soda-lime glass (a product of Central Glass Co. Ltd.) to a thickness of 50 μm. Thereafter, using UV LED lamps respectively having peaks at wavelengths of 405 nm and 365 nm, UV light was irradiated such that accumulated amounts of light were respectively 220 mJ/cm$^2$ and 380 mJ/cm$^2$ to form a temporary cured layer. A PET film (TOYOBO Co., Ltd., product name A4360, thickness 50 μm) was provided on the formed temporary cured layer, and using an automatic heating and pressing processing device (a product of Chiyoda Electronics Co., Ltd., product name ACS-230), bonding processing was performed for 5 minutes under the conditions of a temperature of 30° C. and 0.5 megapascal (MPa).

Next, using a UV-LED having a peak at a wavelength of 395 nm, UV light was irradiated such that an accumulated amount of light was 4000 mJ/cm$^2$ to obtain a laminate. The 180° peel force of the obtained laminate was measured using a tensile tester (a product of INSTRON Co., Ltd., an INSTRON 5965 type). The 180° peel force was measured at a tensile rate of 300 mm/min at a temperature of 25° C.

Evaluation of Folding Reliability and Durability of Adhesive Member

Each of the resin compositions of Examples and Comparative Examples was applied to a thickness of 50 μm on a PET film with a thickness of 50 μm. Using UV LED lamps respectively having peaks at wavelengths of 405 nm and 365 nm, UV light was radiated such that accumulated amounts of light were respectively 220 mJ/cm2 and 380 mJ/cm$^2$ to form a temporary cured layer. A PET film (TOYOBO Co., Ltd., product name A4360, thickness 50 μm) was provided on the formed temporary cured layer, and using an automatic heating and pressing processing device (a product of Chiyoda Electronics Co., Ltd., product name ACS-230), bonding processing was performed for 5 minutes under the conditions of a temperature of 30° C. and 0.5 MPa. Thereafter, using a UV-LED having a peak at a wavelength of 395 nm, UV light was radiated such that an accumulated amount of light was 4000 mJ/cm$^2$ to obtain a laminate having a size of 50 mm×100 mm. Using a planar body no-load U-shaped stretch tester (a product of YUASA SYSTEM Co., Ltd.), a bending jig was installed on a short side of the obtained laminate, and the evaluation was performed in a constant temperature bath of −20° C. or 60° C. Folding was repeated 200,000 times under the conditions of a bending angle of 180°, a bending radius of 3 mm, and a bending rate of 1 second per one time, and then the laminate was observed with the naked eye.

In Tables 3 and 4, "⊚" indicates that there was no change in the appearance of the laminate, and "deformed" indicates that the deformation of the adhesive member and fold marks due to bending were observed. "Peeled off" indicates that the PET film was peeled off from the adhesive member, and "damaged" indicates that the adhesive member was damaged. "Air bubbles" indicates that air bubbles were generated inside the adhesive member, or lift-off was observed between the adhesive member and the PET film.

TABLE 3

| Classifications | Example 1 | Example 2 | Example 3 | Example 4 |
|---|---|---|---|---|
| Viscosity [cP] | 6 | 24 | 17 | 46 |
| Inkjet printing providing | ◉ | ◉ | ◉ | ◉ |
| Glass transition temperature [° C.] | −69 | −32 | −44 | −54 |
| −20° C., stress relaxation ratio [%] | 93 | 81 | 84 | 70 |
| 60° C., stress relaxation ratio [%] | 27 | 18 | 15 | 3 |
| −20° C., deformation recovery rate [%] | 75 | 84 | 89 | 91 |
| 60° C., deformation recovery rate [%] | 84 | 93 | 98 | 99 |
| −20° C., folding reliability and durability | ◉ | ◉ | ◉ | ◉ |
| 60° C., folding reliability and durability | ◉ | ◉ | ◉ | ◉ |
| 25° C., 180° peel force [gf/25 mm] | 820 | 1260 | 1100 | 970 |

TABLE 4

| Classifications | Comparative Example 1 | Comparative Example 2 | Comparative Example 3 | Comparative Example 4 |
|---|---|---|---|---|
| Viscosity [cP] | 5 | 14 | 29 | 108 |
| Inkjet printing providing | ◉ | ◉ | ◉ | X |
| Glass transition temperature [° C.] | −33 | 11 | −63 | −6 |
| −20° C., stress relaxation ratio [%] | 82 | 74 | 55 | 66 |
| 60° C., stress relaxation ratio [%] | 24 | 46 | 2 | 38 |
| −20° C., deformation recovery rate [%] | 42 | 76 | 79 | 79 |
| 60° C., deformation recovery rate [%] | 71 | 91 | 94 | 94 |
| −20° C., folding reliability and durability | Deformed, air bubbles | Damaged | Damaged | Damaged |
| 60° C., folding reliability and durability | Peeled off, air bubbles | Deformed, air bubbles | ◉ | Deformed, air bubbles |
| 25° C., 180° peel force [gf/25 mm] | 540 | 1390 | 440 | 1470 |

Referring to Table 3, the resin compositions of Examples 1 to 5 each have a viscosity in a range of about 5 cP or greater to less than about 50 cP at a temperature of 25° C., so that it can be seen the resin compositions may be easily provided by an inkjet printing method. Each of the resin compositions of Examples 1 to 5 is an embodiment of the resin composition according to the invention, and when provided by an inkjet printing method, the resin composition having a viscosity in a range of about 5 cP or greater to less than about 50 cP at a temperature of 25° C. may be applied to a uniform thickness. An adhesive member formed from each of the resin compositions of Examples 1 to 5 has a glass transition temperature of −70° C. to lower than −30° C., and the adhesive member having a glass transition temperature of −70° C. to lower than −30° C. may exhibit properties of being flexible in a low-temperature environment and may maintain durability in a high-temperature environment.

In addition, the adhesive member formed from each of the resin compositions of Examples 1 to 5 has a 180° peel force of about 800 gf/25 mm or greater at a temperature of 25° C.

The adhesive member formed from each of the resin compositions of Examples 1 to 5 has a stress relaxation ratio (after 10 seconds) in a range of 70% or greater to less than about 95% for a shear strain of 25% at a temperature of −20° C., and has a stress relaxation ratio (after 10 seconds) in a range of about 1% or greater to less than about 30% for a shear strain of 25% at a temperature of 60° C. The adhesive member formed from each of the resin compositions of Examples 1 to 5 has a deformation recovery rate (after 600 seconds) in a range of about 75% or greater to less than about 100% for a shear strain of 25% at temperatures of −20° C. and 60° C.

It can be seen that the adhesive member formed from each of the resin compositions of Examples 1 to 5 which satisfies the aforementioned stress relaxation ratio range and the aforementioned shear strain range at temperatures of −20° C. and 60° C. has high adhesion reliability and folding reliability without the damage or lift-off of the adhesive member in the evaluation of folding reliability and durability. Accordingly, it can be determined that embodiments of the adhesive member according to the invention which satisfies the aforementioned stress relaxation ratio range and the aforementioned deformation recovery rate range in low-temperature and high-temperature environments may exhibit properties of having high adhesion reliability and folding reliability. In addition, it can be determined that embodiments of a display device including the adhesive member according to the invention may exhibit properties of having improved adhesion reliability and folding reliability in low-temperature and high-temperature environments.

Referring to Table 4, the adhesive member formed from the resin composition of Comparative Example 1 has a deformation recovery rate of less than about 75% at temperatures of −20° C. and 60° C., and has a 180° peel force of less than about 800 gf/25 mm at a temperature of 25° C. Accordingly, it can be seen that in the evaluation of folding reliability and durability of the adhesive member formed from the resin composition of Comparative Example 1, the deformation and peeling off of the adhesive member occurred. In addition, it can be seen that in the evaluation of folding reliability and durability of the adhesive member formed from the resin composition of Comparative Example 1, air bubbles were generated inside the adhesive member or lift-off was observed between the adhesive member and the PET film.

The adhesive member formed from the resin composition of Comparative Example 2 has a high glass transition temperature of 11° C., and it can be seen that the adhesive member was damaged in the evaluation of folding reliability and durability at a temperature of −20° C. Since the adhesive member formed from the resin composition of Comparative Example 2 has a high glass transition temperature, it can be determined that the flexibility of the adhesive member was degraded at a temperature of −20° C.

In addition, the adhesive member formed from the resin composition of Comparative Example 2 has a stress relaxation ratio of about 30% or greater at a temperature of 60° C., and it can be seen that the adhesive member was deformed when folding and unfolding were repeated. It can be seen that in the adhesive member formed from the resin composition of Comparative Example 2, air bubbles were generated inside the adhesive member or lift-off was observed between the adhesive member and the PET film when folding and unfolding were repeated at a temperature of 60° C.

The adhesive member formed from the resin composition of Comparative Example 3 has a stress relaxation ratio of less than about 70% at a temperature of −20° C., and a 180° peel force of less than about 800 gf/25 mm at a temperature of 25° C. Accordingly, it can be seen that the adhesive member formed from the resin composition of Comparative Example 3 was damaged in the evaluation of folding reliability and durability. It can be determined that the adhesive member formed from the resin composition of Comparative Example 3 was damaged due to accumulated stress inside the adhesive member when folding and unfolding were repeated.

The resin composition of Comparative Example 4 has a high viscosity of 108 cP at a temperature of 25° C., and it can be seen that the resin composition was not discharged when provided by an inkjet printing method. The adhesive member formed from the resin composition of Comparative Example 4 has a glass transition temperature of −30° C. or higher, and has a stress relaxation ratio of less than about 70% at −20° C. Accordingly, it can be seen that the adhesive member formed from the resin composition of Comparative Example 4 was damaged in the evaluation of folding reliability and durability at a temperature of −20° C.

In addition, the adhesive member formed from the resin composition of Comparative Example 4 has a stress relaxation ratio of about 30% or higher at a temperature of 60° C., and it can be seen that the adhesive member was deformed in the evaluation of folding reliability and durability at a temperature of 60° C. It can be seen that in the adhesive member formed from the resin composition of Comparative Example 4, air bubbles were generated inside the adhesive member or lift-off was observed between the adhesive member and the PET film when folding and unfolding were repeated at a temperature of 60° C.

Embodiment of an adhesive member according to the invention include a polymer derived and formed from a resin composition, where the resin composition may have a viscosity in a range of about 5 cP or greater to less than about 50 cP at a temperature of 25° C. Accordingly, in such embodiments, the resin composition may be easily provided by an inkjet printing method.

Embodiments of the adhesive member according to the invention may have a deformation recovery rate in a range of about 75% or greater to less than about 100% at temperatures of −20° C. and 60° C. In such embodiments, the adhesive member may have a stress relaxation ratio in a range of about 70% or greater to less than about 95% at a temperature of −20° C., and a stress relaxation ratio in a range of about 1% or greater to less than about 30% at a temperature of 60° C. The adhesive member having a high deformation recovery rate at temperatures of −20° C. and 60° C. and satisfying the aforementioned stress relaxation ratio range may exhibit properties of having high adhesion reliability and folding reliability in low-temperature and high-temperature environments.

Embodiments of a display device according to the invention may include a display panel, a window disposed on the display panel, and an adhesive member disposed between the display panel and the window. In such an embodiment, a display device including the adhesive member may exhibit properties of having improved reliability in accordance with changes in temperature.

Embodiments of an adhesive member according to the invention may exhibit properties of having high adhesion reliability and folding reliability by satisfying a predetermined range of glass transition temperature, peel force, and deformation recovery rate.

Embodiments of a display device according to the invention may exhibit properties of having high adhesion reliability and folding reliability in low-temperature and high-temperature environments by including an adhesive member disposed between a display panel and a window.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. An adhesive member comprising a polymer derived from a resin composition including at least one (meth) acrylate monomer, at least one urethane (meth)acrylate oligomer, and at least one photoinitiator,
wherein the at least one (meth)acrylate monomer comprises 2-ethylhexyl-diglycol acrylate,
wherein the adhesive member has a glass transition temperature in a range of about −70° C. or greater to less than about −30° C., a 180° peel force of about 800 gf/25 mm or greater for a glass substrate at a temperature of 25° C., and a deformation recovery rate in a range of about 75% or greater or to less than about 100% at temperatures of −20° C. and 60° C.,
wherein the deformation recovery rate satisfies the following equation:

$$X_2 = [1-(X_1/25)] \times 100\%,$$

wherein
$X_1$ denotes a shear strain measured 600 seconds after removing a shear stress applied in a way such that the adhesive member has a shear strain of 25% at the temperatures of −20° C. and 60° C., and
$X_2$ denotes the deformation recovery rate.

2. The adhesive member of claim 1, wherein the adhesive member has a first stress relaxation ratio in a range of about 75% or greater to less than about 95% for the shear strain of 25% at a temperature of −20° C.,
wherein the first stress relaxation ratio satisfies the following equation:

$$Y_3 = [1-(Y_1/Y_2)] \times 100\%,$$

wherein
$Y_1$ denotes a first shear stress measured immediately after the shear strain of 25% is exhibited at the temperature of −20° C.,
$Y_2$ denotes a second shear stress measured 10 seconds after the shear strain of 25% is exhibited at the temperature of −20° C., and
$Y_3$ denotes the first stress relaxation ratio.

3. The adhesive member of claim 1, wherein the adhesive member has a second stress relaxation ratio in a range of about 1% or greater to about 30% for the shear strain of 25% at a temperature of 60° C., wherein the second stress relaxation ratio satisfies the following equation:

$$Z_3 = [1-(Z_1/Z_2)] \times 100\%,$$

wherein
$Z_1$ denotes a third shear stress measured immediately after the shear strain of 25% is exhibited at the temperature of 60° C., Z$_2$ denotes a fourth shear stress measured 10 seconds after the shear strain of 25% is exhibited at the temperature of 60° C., and Z$_3$ denotes the second stress relaxation ratio.

4. The adhesive member of claim 1, wherein the resin composition has a viscosity in a range of about 5 cP or greater to less than about 50 cP as measured at a temperature of 25° C. according to JIS K 2283.

5. The adhesive member of claim 1, wherein the (meth)acrylate monomer has a weight average molecular weight in a range of about 100 to about 500, and
the urethane (meth)acrylate oligomer has a weight average molecular weight in a range of about 10,000 or greater to less than about 40,000.

6. The adhesive member of claim 1, wherein the urethane (meth)acrylate oligomer comprises a plurality of acryl groups.

7. The adhesive member of claim 1, wherein the at least one (meth)acrylate monomer further comprises 2-ethylhexyl acrylate, 4-hydroxybutyl acrylate, and/or tetrahydrofurfuryl acrylate.

8. A display device comprising:
a display panel;
a window disposed on the display panel; and
an adhesive member disposed between the display panel and the window, wherein the adhesive member includes a polymer derived from a resin composition having at least one (meth)acrylate monomer, at least one urethane (meth)acrylate oligomer, and at least one photoinitiator,
where the at least one (meth)acrylate monomer comprises 2-ethylhexyl-diglycol acrylate,
wherein the adhesive member has a glass transition temperature in a range of about −70° C. or to about −30° C., a 180° peel force of about 800 gf/25 mm or greater for a glass substrate at a temperature of 25° C., and a deformation recovery rate in a range of about 75% or greater to less than about 100% at temperatures of −20° C. and 60° C.,
wherein the deformation recovery rate satisfies the following equation:

$$X_2 = [1-(X_1/25)] \times 100\%,$$

wherein
X$_1$ denotes a shear strain measured 600 seconds after removing a shear stress applied in a way such that the adhesive member has a shear strain of 25% at the temperatures of −20° C. and 60° C., and
X$_2$ denotes the deformation recovery rate.

9. The display device of claim 8, wherein the adhesive member has a first stress relaxation ratio in a range of about 75% or greater to less than about 95% for the shear strain of 25% at a temperature of −20° C., wherein the first stress relaxation ratio satisfies the following equation:

$$Y_3 = [1-(Y_1/Y_2)] \times 100\%,$$

wherein
Y$_1$ denotes a first shear stress measured immediately after the adhesive member exhibits the shear strain of 25% at the temperature of −20° C.,
Y$_2$ denotes a second shear stress measured 10 seconds after the adhesive member exhibits the shear strain of 25% at the temperature of −20° C., and
Y$_3$ denotes the first stress relaxation ratio.

10. The display device of claim 8, wherein the adhesive member has a second stress relaxation ratio in a range of about 1% or greater to less than about 30% for the shear strain of 25% at a temperature of 60° C., wherein the second stress relaxation ratio satisfies the following equation:

$$Z_3 = [1-(Z_1/Z_2)] \times 100\%,$$

wherein
Z$_1$ denotes a third shear stress measured immediately after the adhesive member exhibits the shear strain of 25% at the temperature of 60° C.,
Z$_2$ denotes a fourth shear stress measured 10 seconds after the adhesive member exhibits the shear strain of 25% at the temperature of 60° C., and
Z$_3$ denotes the second stress relaxation ratio.

11. The display device of claim 8, wherein the resin composition has a viscosity in a range of about 5 cP or greater to less than about 50 cP as measured at a temperature of 25° C. according to JIS K 2283.

12. The display device of claim 8, wherein
the (meth)acrylate monomer has a weight average molecular weight in a range of about 100 to about 500, and
the urethane (meth)acrylate oligomer has a weight average molecular weight in a range of about 10,000 or greater to less than about 40,000.

13. The display device of claim 8, wherein the adhesive member has a thickness in a range of about 50 μm to about 200 μm.

14. The display device of claim 8, wherein the adhesive member is formed by providing the resin composition on one surface of the window or on one surface of the display panel, and then ultraviolet curing the resin composition.

15. The display device of claim 8, further comprising:
a light control layer disposed between the adhesive member and the window; and
an optical adhesive layer disposed between the light control layer and the window,
wherein the optical adhesive layer includes a polymer derived from the resin composition, and
wherein the light control layer is a polarizing plate or a color filter layer.

16. The display device of claim 15, wherein
the optical adhesive layer has a 180° peel force of about 800 gf/25 mm or greater at a temperature of 25° C.,
wherein the 180° peel force is a peel force for a glass substrate.

17. The display device of claim 8, further comprising:
an input sensing unit disposed on the display panel,
wherein the adhesive member is disposed between the display panel and the input sensing unit or between the input sensing unit and the window.

18. The display device of claim 17, wherein
the display panel comprises a display element layer and an encapsulation layer disposed on the display element layer,
wherein
the input sensing unit is disposed on the encapsulation layer, and
the adhesive member is disposed on the input sensing unit.

19. The display device of claim 8, wherein
at least one folding region is defined in the display device,
wherein the folding region has a radius of curvature of about 5 mm or less.

20. The display device of claim 8, wherein the at least one (meth)acrylate monomer further comprises 2-ethylhexyl acrylate, 4-hydroxybutyl acrylate, and/or tetrahydrofurfuryl acrylate.

* * * * *